(No Model.)
R. H. GLEASON.
UNIVERSAL JOINT.
No. 308,355. Patented Nov. 25, 1884.
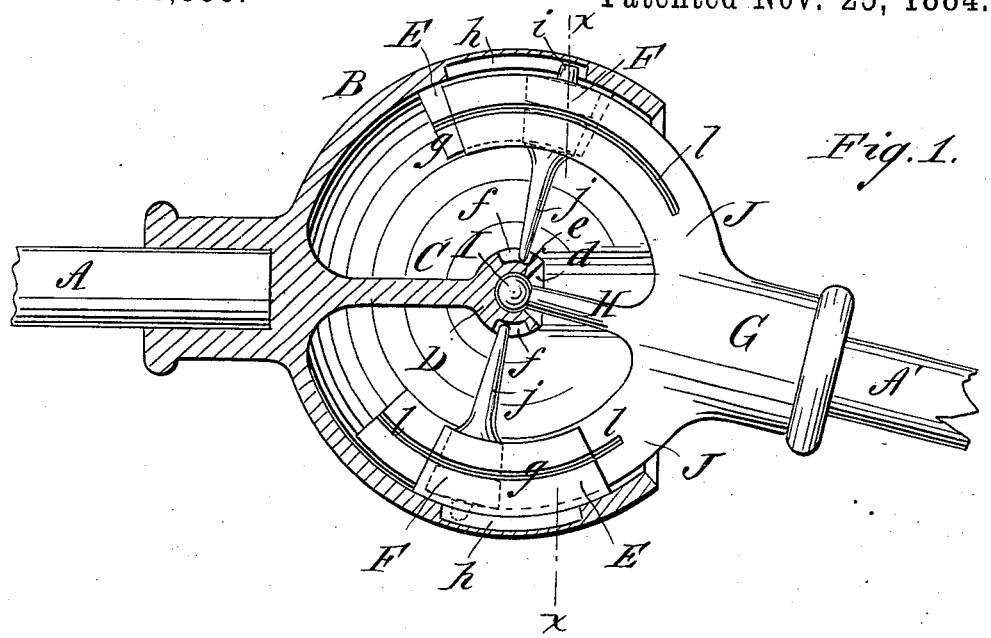
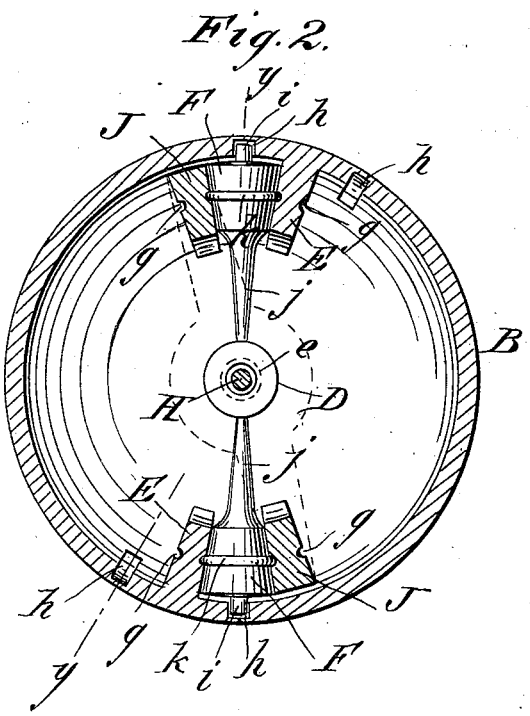
WITNESSES:
Donn Twitchell.
C. Sedgwick.
INVENTOR:
R. H. Gleason
BY Munn & Co.
ATTORNEYS.

UNITED STATES PATENT OFFICE.

ROLLIN H. GLEASON, OF EGAN, DAKOTA TERRITORY.

UNIVERSAL JOINT.

SPECIFICATION forming part of Letters Patent No. 308,355, dated November 25, 1884.

Application filed April 25, 1884. (No model.)

*To all whom it may concern:*

Be it known that I, ROLLIN H. GLEASON, of Egan, in the county of Moody and Territory of Dakota, have invented a new and Improved Universal Joint, of which the following is a full, clear, and exact description.

The object of this invention is to provide a simple anti-friction universal or knuckle joint for the tumbling-rods of thrashing-machines, and for other purposes.

The invention consists in providing one of two abutting ends of two shafts revolving in the same direction but meeting at an angle with a socket, which socket has an inwardly-projecting rib or flange upon its opposite interior sides.

The invention further consists in providing the other abutting end with a hub, from which project two spurs or arms adapted to enter the before-mentioned socket.

The invention further consists in friction-rollers held in the before-mentioned socket to be between the flanges of the socket and the arms of the hub when the said socket and arms are engaged with each other; and the invention further consists in details of construction and combinations of parts, as will be hereinafter more fully set forth.

Reference is to be had to the accompanying drawings, forming part of this specification, in which similar letters of reference indicate corresponding parts in both the figures.

Figure 1 is a partly-sectional longitudinal view of a knuckle-joint of my improved construction, the section being on the line $y\ y$ of Fig. 2; and Fig. 2 is a cross-sectional view of the same on the line $x\ x$ in Fig. 1.

A and A' are two sections of a shaft coupled together at an angle by a knuckle or universal joint. B is a socket secured upon the end of the shaft-section A. C is an arm projecting from the base of the socket B, in line with the axis of the shaft A, and having an enlargement, D, at its end, which enlargement is provided with a conical recess, $d$, in its outer side, terminating in a circular central socket, $e$, the center of which socket $e$ is at the common center of all the parts of the joint.

In two diametrically-opposite sides of the enlargement D are formed two circumferential slots, $f$, for a purpose which will be hereinafter described. Upon the inner walls of the socket B, at diametrically-opposite points, are formed two segmental flanges, E, the sides or faces of which are upon radial lines from the center of the socket $e$. In both faces of these flanges E are formed segmental grooves $g$, and in the walls of the socket B, each side of and at a short distance from the flanges E, are formed grooves $h$. Conical rollers F, whose sides if prolonged would meet at the center of the socket $e$, have short pivots $i$ at their outer or larger ends adapted to engage with the grooves $h$, and long pivots $j$ projecting from their smaller end, which pivots extend to and engage with the grooves $f$ of the enlargement D.

Midway of the length of the rollers F are circumferential ridges $k$, adapted to fit and travel in the grooves $g$ of the flanges E.

Upon the shaft-section A' is secured a hub, G, and from the hub G extends in the line of the horizontal axis of the shaft A' an arm, H, having a ball, I, formed upon its outer end, which ball I is adapted to fit into the socket $e$ of the enlargement D, forming therewith a ball-and-socket joint.

From diametrically-opposite points of the hub G extend segmental arms J, which arms are curved upon a circle the center of which is the center of the ball I, and the outside diameter of which is such that the said arm can move freely within the socket B. Upon the opposite faces of the arms J are grooves $l$, corresponding with the grooves $g$ of the flanges E.

In operation the rollers F are placed in position in the socket B, the arms J are entered within the socket B, the ball I entering the socket $e$, such arm being opposite a flange, E, with a roller, F, between, and the ridges $k$ of the rollers engaging with the grooves $g$ and $l$ of flanges E and arms J, respectively. If either of the shaft-sections is revolved, it will revolve the other shaft-section by the engagement of the arms J with the flanges E, and the friction which would naturally take place between the said arms and flanges is obviated by the rollers F interposed between them. The ball-and-socket joint I D keeps the central axis of the two shaft-sections always meeting at one point. The rollers F and the arms are guided by the ridges $k$ and grooves $g$ and $l$, and as all parts are arranged to work from a common center there will be little friction and no lost motion. This joint is particularly applicable to the tumbling-rods of large thrashing-machines, and will be found to effect a great saving of power wherever applied. By placing the arms J in the socket B so that the said arms will be upon the opposite side of the flanges E from that shown, and arranging the rollers F upon the opposite sides of the flanges with their short pivots in the corresponding grooves $h$, the shaft-sections can be revolved in the opposite direction.

Having thus described my invention, I claim as new and desire to secure by Letters Patent—

1. In a universal joint, a socket having segmental flanges, in combination with a hub having radial arms adapted to fit into the socket, and with friction-rollers arranged to be between the flanges of the socket and the arms of the hub when the same are engaged, substantially as shown and described.

2. In a universal joint having a socket provided with segmental flanges and a hub having segmental arms adapted to work within the socket, and rollers arranged in the socket to work between the said arms and flanges, a ball-and-socket joint arranged at the common center of the said joint and connected with the aforesaid socket and hub, substantially as shown and described.

3. The combination, with the socket B, having the flanges E, and the arms C, provided with the enlargement D, having the socket $e$, of the hub G, having the arms J, and also the arm H, having the ball I, and of the conical rollers F, substantially as shown and described.

4. In a universal joint, the combination, with the socket B, having flanges E, and provided with grooves $h$, and also having an arm, C, having an enlargement, D, provided with grooves $f$, of the conical rollers F, having pivots $i$ and $j$, substantially as shown and described.

5. In a universal joint, the combination, with the socket B, having flanges E, provided with grooves $g$, and the hub G, having arms J, provided with grooves $l$, of the conical rollers F, provided with ridges $k$, substantially as shown and described.

6. A universal joint in which a ball-and-socket joint is formed at the meeting points of the longitudinal axes of the two portions of the joint, and in which all the parts which work upon each other are formed upon radial and circumferential lines having their common center at the center of the ball-and-socket joint, substantially as shown and described.

ROLLIN H. GLEASON.

Witnesses:
I. H. ENO,
R. ILSLEY.